March 31, 1964 E. P. STRONG ETAL 3,126,648
AUTOMATIC PACER
Filed June 12, 1961 3 Sheets-Sheet 1

INVENTORS.
EARL P. STRONG
JAMES W. BRUCE
BY Robert B Harmon
ATTORNEYS.

March 31, 1964
E. P. STRONG ETAL
3,126,648
AUTOMATIC PACER
Filed June 12, 1961
3 Sheets-Sheet 2
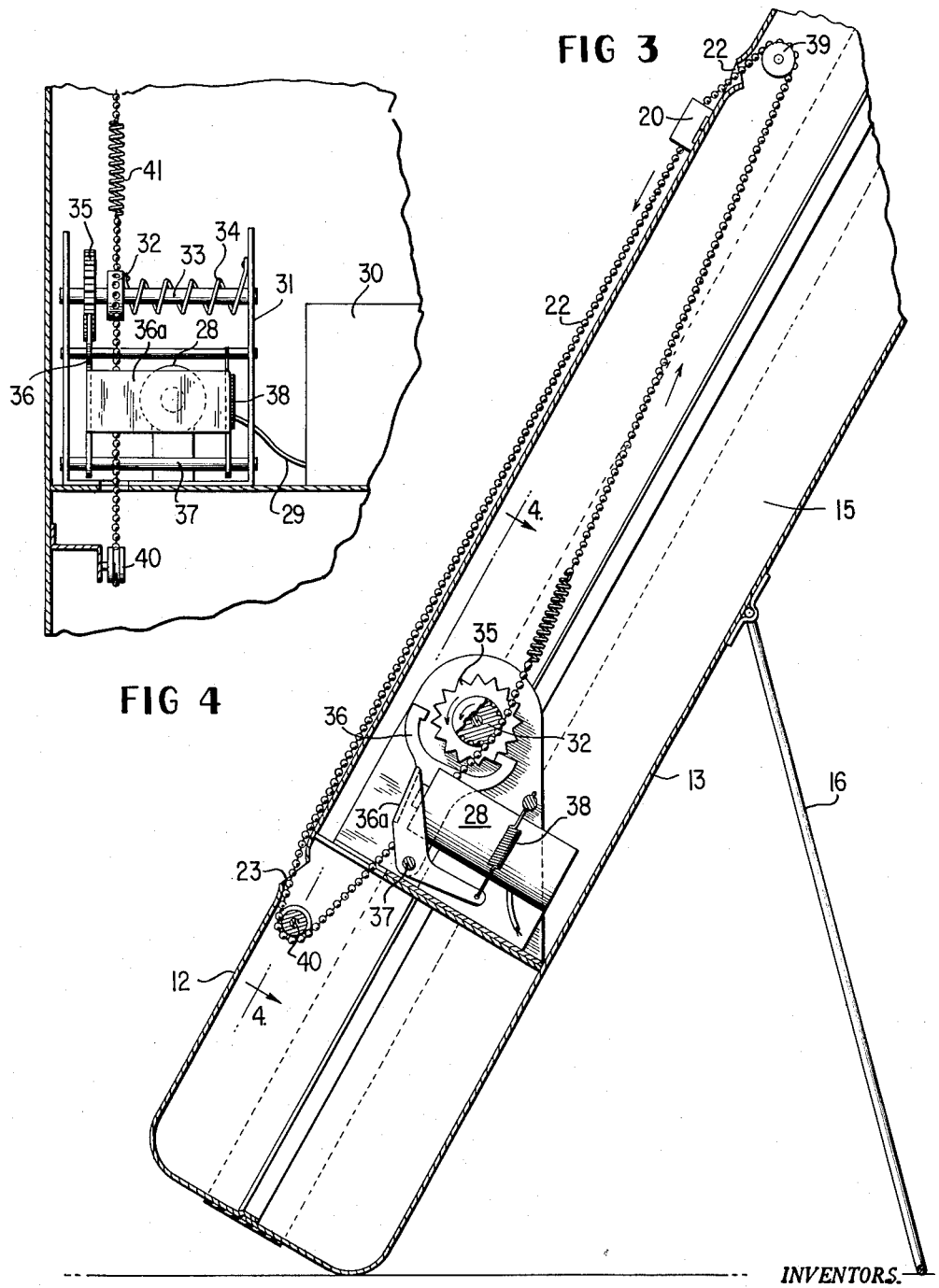
INVENTORS.
EARL P. STRONG
JAMES W. BRUCE
BY
Robert B Harmon
ATTORNEYS.

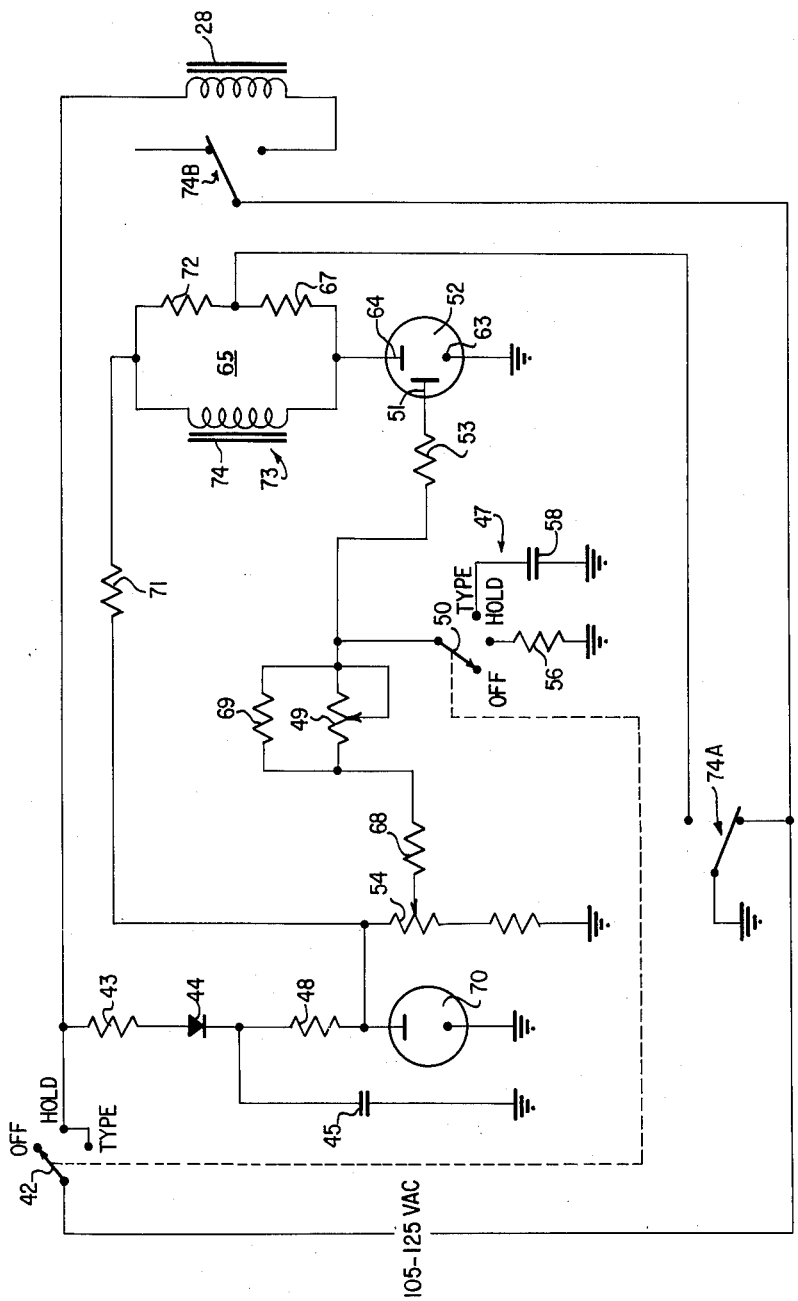

3,126,648
AUTOMATIC PACER

Earl P. Strong, 1337 S. Garner St., State College, Pa., and James W. Bruce, State College, Pa.; said Bruce assignor to said Strong Filed June 12, 1961, Ser. No. 116,443
11 Claims. (Cl. 35—35)

This invention relates generally to pacer devices for educational training, and more particularly to an automatic pacer adapted to electronically pace a typing or reading student during a performance drill.

In training typing students to acquire a high degree of speed and accuracy, the use of a pacing mechanism which will permit the student to move through a specified typing drill at a predetermined speed is often beneficial. Pacer devices of this nature are also of great benefit to the accomplished typist who wishes to acquire greater typing skill through the use of basic typing drills. Skill in the use of the typewriter is not enhanced through the normal daily use of the skill, but, in fact, usually suffers in terms of speed and accuracy while being practiced on the job. It has been found that skill in the use of a typewriter may be maintained and increased by the performance of short interval typing drills. In carrying out such drills, typists need to be motivated to move faster than they normally do in performing their daily typing tasks, and by pacing a typing student or an accomplished typist, basic skills can be forced to a higher level. Both student and experienced typists find it difficult to force the development of typing skill through their own motivations, and thus the utilization of a method for pacing the typist through a typing drill provides an incentive to encourage the typist to attain increased capabilities.

In the past, the pacing of a student typist or an accomplished typist has often been performed by a second typist working upon another machine. This use of a human coach to pace the speed of a typist is expensive and is not practical for the typist normally found on a production job. There have been, therefore, several attempts to develop pacing devices to replace the human coach.

Basic to all pacing devices is the metronome, which is widely used for timing purposes in developing music skills. The metronome is not adapted for use in the teaching of typing skills, as typing is not based upon the equal timing of each stroke, but rather upon the unequal timing of strokes, depending upon the difficulty of the word or combinations within the word. An expert typist does not type evenly, as would be dictated by metronomic timing, but rather unevenly, using a rhythm that is sequential but not metronomic; rippling, but not at one speed. Several of the prior pacer devices developed for use in typing instruction have been based upon metronomic timing and therefore have not allowed for flexibility in varying typing performance. Also, many of these prior pacer devices have been limited to only a single pacing speed, and have thereby been limited in use to but one person typing at a given rate of speed, or, at best, to a small group typing at one particular rate of speed. Other pacers have been developed which allow for flexibility in pacing, but these units have basically employed a visual projector utilizing a film of the strip variety. Units of this type permit the setting of various time sequences which appear upon a screen as a shade drop. However, this shade drop principle incorporates a number of distinct disadvantages, as apparatus of this type and the film utilized thereby is costly to an extent which makes the device unavailable to a single typist or to a small organization or school.

A primary object of this invention is to provide an improved automatic pacer capable of providing reliable timing and pacing during a reading or typing drill.

Another object of this invention is to provide an automatic pacer having a dual range of operation to permit the timing of reading drills in one range and typing drills in the remaining range.

A further object of this invention is to provide an automatic pacer which is reliable in timing and pacing and yet which incorporates flexibility in terms of speed and range.

A still further object of this invention is to provide an automatic electronic pacer of small compact size which incorporates simplicity of operation and which may be economically obtained.

The above and further objects and details of the invention will be readily apparent upon a consideration of the following specification taken with the accompanying drawings in which:

FIGURE 3 is a sectional view of the pacer device of FIGURE 1 taken along lines 3—3 of FIGURE 1;

FIGURE 4 is a sectional view in front elevation illustrating the mechanical drive mechanism of FIGURE 3;

FIGURE 6 is a schematic representation of a modification of the timing circuit of FIGURE 5.

Figure 1:
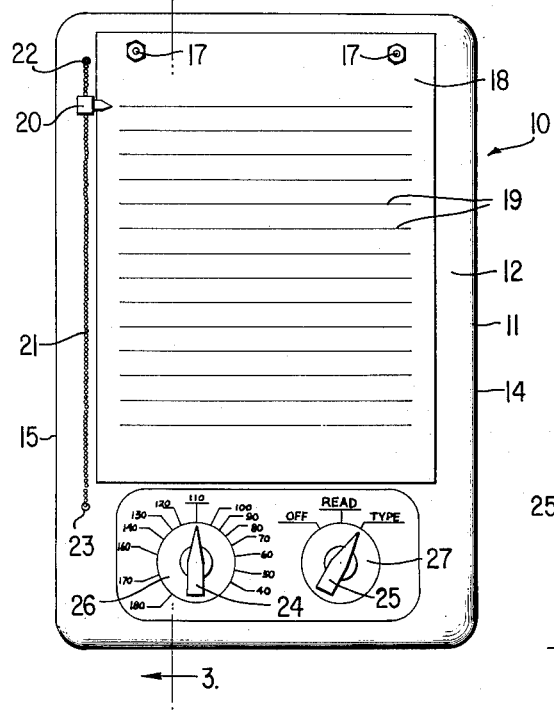
FIGURE 1 is a view in front elevation illustrating the pacer device of the subject invention.
Figure 2:
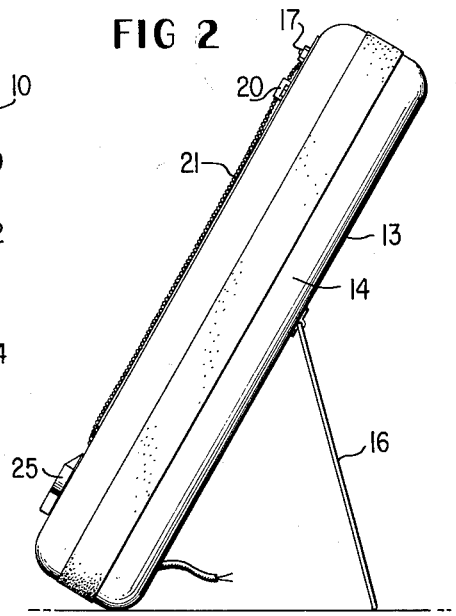
FIGURE 2 is a view in side elevation illustrating the pacer device of FIGURE 1.

Referring now to FIGURES 1 and 2, the electronic pacer of the present invention indicated generally at 10 consists of a compact casing 11 which includes a front or face wall 12, a rear wall 13, and side walls 14 and 15. Pivotally attached to the rear wall 13 is a support arm 16 which may be moved from a position adjacent the rear wall to an extended position whereby the pacer unit 10 may be supported in a substantially upright attitude.

The face wall 12 of the pacer unit 10 is provided with a sheet securing mechanism 17 positioned adjacent to the upper edge thereof. The sheet securing member 17 operates to clamp a drill sheet 18 having horizontal lines of drill material 19 provided thereon to the face wall 12. In FIGURE 1, the securing mechanism 17 is illustrated as consisting of a pair of spaced projecting threaded studs having nut members threaded thereon. It is, of course, obvious that any suitable clamping means may be utilized to secure the drill sheet 18 to the face wall 12 of the pacer unit.

Provided at one side of the face wall 12 adjacent the drill sheet 18 is a pointer 20 which is mounted upon a vertically extended drive chain 21. Drive chain 21 passes through spaced apertures 22 and 23 provided in the face wall 12 to the interior of the pacer casing 11. In some instances, it might be desirable to utilize an illuminated indicator in place of the pointer 20. In this case, a plurality of apertures would be provided in the face wall 12 adjacent each of the lines 19 of the drill sheet 18. A light would then be attached to the chain 21 to replace the pointer 20, and the chain drive 21 would be mounted within the casing 11 so that the light would sequentially pass behind each of the apertures in the face wall 12. In lieu of the chain drive, a plurality of fixed lights might be provided behind the apertures. These lights would be selectively energized by a suitable timing unit within the pacer casing 11.

Projecting from the face wall 12 between the bottom edge thereof and the bottom edge of the drill sheet 18 are two control knobs 24 and 25. Knob 24 is a multi-position speed control knob, and is surrounded by indicia 26 which is representative of speed in words per minute. Knob 25 is a three-position control knob which is operable to switch the pacer unit from an "off" condition to one of the two operating conditions indicated by the indicia 27.

FIGURES 3 and 4 illustrate the mechanical drive mechanism which is positioned within the pacer casing 11. The drive mechanism consists of a solenoid 28 which is electrically connected by means of a connector 29 to an electrical timing circuit encased within a housing 30. Solenoid 28 is mounted within a frame 31 which rotatably supports a ball sprocket wheel 32 mounted upon an axle rod 33. A spring 34 is wound about the axle rod 33 and is attached at one end to the ball sprocket wheel 32 and at the opposite end to the frame 31. Also mounted upon the axle rod 33 on the side of the ball sprocket wheel 32 opposite to the spring 34 is a ratchet wheel 35. Cooperating with the ratchet wheel 35 is a ratchet arm 36 which is pivotally mounted upon bar 37 carried by the frame 31. Ratchet arm 36 includes an integral plate portion 36A which extends at a right angle to the ratchet arm 36 across the face of the solenoid 28. A spring 38 is connected to bias the plate 36A away from the solenoid 28.

Rotatably mounted upon the inner side of the side wall 15 of the casing 11 is an upper idler wheel or bearing surface 39 and a lower idler wheel or bearing surface 40. Extending between the idler wheels 39 and 40 around the ball sprocket drive wheel 32 is the pointer drive chain 21 of FIGURE 1. Drive chain 21 may be provided with a tensioning spring which applies tension to the chain and causes it to adhere tightly to the drive wheel 32.

Figure 5:
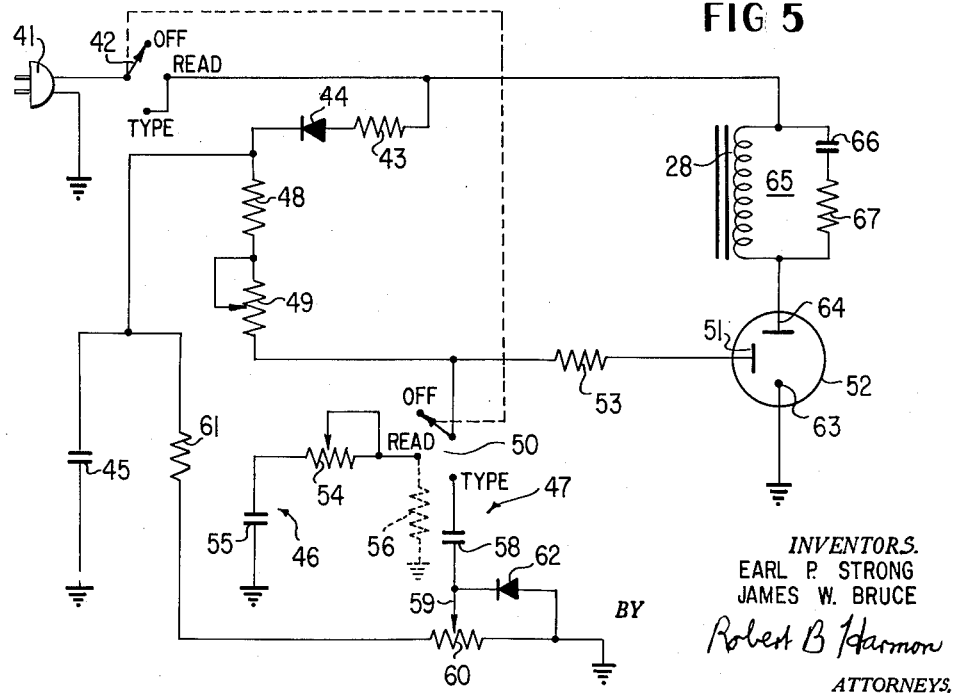
FIGURE 5 is a schematic representation of the timing circuitry of the present invention.

FIGURE 5 illustrates the timing circuitry contained within the housing 30 of FIGURE 3. Referring to FIGURE 5, when a three-position power switch 42 is moved from the "off" position, power is furnished to the timing circuit from a 110 volt A.C. 60 cycle power source by means of a connector plug 41. This A.C. input power is passed from the switch 42 to a rectifier section consisting of a resistor 43, a selenium rectifier 44, and a grounded filter capacitor 45. The rectifier 44 converts the A.C. input signal into a pulsating D.C. signal which is filtered by the action of the capacitor 45. This rectified D.C. signal is then fed to the trigger anode or control electrode 51 of a gas tube 52 and to either a "read" timing circuit, indicated generally at 46, or a "type" timing circuit, indicated generally at 47. Common to both the timing circuits 46 and 47 are a resistor 48 and a variable timing resistor 49 in series with the rectifier 44 which pass the filtered D.C. signal to a three-position switching unit 50. Timing resistor 49 is mechanically connected to the speed control knob 24 of FIGURE 1. The switching unit 50 may be selectively moved from an "off" position to a contact position with the "read" timing circuit 46 or the "type" timing circuit 47, so that the circuits 46 and 47 receive D.C. power from the rectifier 44 and are selectively coupled to the trigger anode 51 of the gas tube 52 by means of a limiting resistor 53. The three-position switch 50 is suitably coupled to the three-position switch 42, which is in turn connected to the control knob 25 of FIGURE 1.

The "read" timing circuit 46 includes a variable resistor 54 which is serially connected to a grounded capacitor 55. The resistance value of the resistor 54 is small enough, in comparison to the resistance values of the resistors 48 and 49, so that no noticeable effect is exerted upon the charging of the capacitor 55 by the resistor 54. In some instances, it might be desirable to omit the "read" timing circuit 46 and substitute a standby circuit therefor. This standby circuit would include a grounded resistor 56, indicated by the dotted lines of FIGURE 5.

The "type" timing circuit 47 includes a capacitor 58 which is electrically connected to the type contact of the switch 50. One plate of the capacitor 58 is connected to the arm 59 of a variable resistor 60 which, in turn, is connected in series with a resistor 61. Resistors 60 and 61 shunt the grounded capacitor 45, while a rectifier 62, serially connected with capacitor 58, shunts the resistor 60.

Gas tube 52 includes a grounded cathode 63 and a plate 64 in addition to the trigger anode 51. It would be possible to substitute any suitable electronic tube for the gas tube 52. The grid element of the electronic tube would then perform the function of the trigger anode 51. Trigger anode 51 receives pulses from either the "read" timing circuit 46 or the "type" timing circuit 47 which shunt the cathode-trigger anode circuit of tube 52, while the plate 64 receives the A.C. input voltage from the switch 42 across a plate circuit 65. The plate circuit 65 includes the solenoid 28 of FIGURE 3 and a serially connected capacitor 66 and resistor 67 shunting the solenoid 28.

In the operation of the electronic pacer of the present invention, the pointer 20 is aligned with the first line on the drill sheet 18 by manually moving the chain drive 21 upwardly or downwardly. If a chain driven light indicator is used in place of the pointer 20, a reset knob connected to the ratchet wheel 35 would be provided on the casing 11 so that the ratchet wheel could be manually rotated to position the light indicator. After the pointer 20 is positioned, the speed control knob 24 is moved to the desired speed indicated in words per minute. The movement of the speed control knob 24 in turn sets the resistance value of the variable timing resistor 49.

The control switch 25 may then be switched from the "off" position to either the "read" or the "type" positions. When the control knob 25 is switched to the "read" position, both the switches 42 and 50 will also be moved to the "read" contact position. In this position, rectified D.C. pulses from the rectifier 44 will be supplied across the resistors 48 and 49, the switch 50, and the resistor 54 to the capacitor 55. Capacitor 55 begins to charge at a rate determined by the resistance 48 and the set resistance value of the speed control resistor 49.

As the capacitor 55 is charging, A.C. voltage is supplied across the switch 42 to the plate circuit 65 and the plate 64 of tube 52. When the capacitor 55 charges to the firing potential of the tube 52, and when the A.C. voltage at the plate 64 approaches its maximum value, the tube 52 will fire, causing the capacitor 55 to discharge through the cathode to trigger anode circuit. The resistor 54 serves to compensate for tube variations of the tube 52. When the tube 52 fires, the surge of current through the plate circuit 65 causes the energization of the solenoid 28 which, in turn, magnetically attracts the plate 36A of the ratchet arm 36 of FIGURE 4 to actuate the ratchet arm. The capacitor 66 and resistor 67 shunting the solenoid 28 serve to briefly maintain the voltage across the solenoid 28 after the tube 52 deionizes. The actuation of the ratchet arm 36 by the solenoid 28 causes the ratchet wheel 35 to rotate one notch and, in turn, to rotate the ball sprocket drive wheel 32. Rotation of the ball sprocket drive wheel 32 causes the drive chain 21 to move the pointer 20 down one line of the drill sheet 18. It may thus be seen, that the pointer 20 is moved down the drill sheet 18 at a speed determined by the setting of the time control knob 24 which sets the resistor 49 to control the charging time of the capacitor 55.

When the control knob 25 is moved to the "type" position, the circuit of FIGURE 5 causes the actuation of the ratchet mechanism of FIGURE 4 in much the same manner as previously described with respect to the "read" position. However, as a typist is not capable of completing a drill sheet as rapidly as a reader might complete the same sheet, the capacitor 58 of the "type" timing circuit must require a longer charging time than does the capacitor 55 of the "read" timing circuit. Capacitor 58 causes the firing of the tube 52 in much the same manner as does the capacitor 55. The variable resistor 60 acts as a trim potentiometer to compensate for variations in the firing point of various tubes which may be substituted for the tube 52, and the diode 62 is used to bypass the resistor 60 when the capacitor 58 discharges through the cathode trigger anode circuit of the tube 52.

FIGURE 6 provides an illustration of a timing circuit which is a modification of the timing circuit of FIGURE 5, and for clarity of description, circuit components of FIGURE 6 performing functions similar to those of FIGURE 5 will be designated by like reference numerals. Referring now to the timing circuit of FIGURE 6, when the three-position power switch 42 is moved from the "off" position, power is furnished to the circuit from a suitable input power source, which may comprise a 110 volt A.C. 60 cycle source. Three-position switch 42 is suitably coupled to the three-position switch 50 in the manner described in connection with FIGURE 5. Upon the operation of switch 42, switch 50 is moved into contact with either the "hold" circuit 56 or the "type" timing circuit 47 which includes the timing capacitor 58. It is obvious that the "read" timing capacitor 55 of FIGURE 5 might be substituted for the "hold" circuit 56 if a "read" timing function is desired.

The A.C. input voltage from the switch 52 is rectified by the rectifier 44 and filtered by the filter capacitor 45. The filtered D.C. output signal from the rectifier 44 is passed to the switching unit 50 by means of the resistor 48, the variable resistance 54, resistor 68, and the variable timing resistor 49. Variable timing resistor 49 is mechanically connected to the speed control knob 24 of FIGURE 1, and is provided with a parallel resistance 69 which acts to minimize the inherent variations which might arise through the utilization of various timing resistors. Variable resistor 54 acts in the same manner as does the variable resistor 54 of FIGURE 5 to compensate for tube variations of the tube 52.

A suitable diode 70, which may comprise a diode gas tube, is connected between resistor 48 and ground to provide a voltage regulation function. Voltage regulator 70 operates in a conventional manner to prevent normal variations in line voltage from affecting the voltage applied to the timing circuit 47.

The plate 64 of the tube 52 receives filtered D.C. voltage from the rectifier 44 across the resistor 48, a resistor 71, and the plate circuit 65. Plate circuit 65 includes the resistor 67 in series with a resistor 72 which replaces the capacitor 66 of FIGURE 5. Series resistors 67 and 72 shunt a relay unit 73, which is connected to control the operation of the solenoid 28.

Relay unit 73 is a double pole, double throw relay unit having a set of contacts 74A and a set of contacts 74B operated by a coil 74. Contacts 74A are electrically connected to a point between the resistors 72 and 67, and also to the A.C. input power source, and are adapted to selectively disconnect input power from the rectifying and timing circuits by placing a ground connection between the resistors 67 and 72.

Contacts 74B are connected to the input A.C. power source and are adapted to selectively place A.C. input power across the solenoid 28, which in turn actuates the mechanical stepping mechanisms of FIGURE 3.

In the operation of the electronic timing circuit illustrated by FIGURE 6, the application of input power to the rectifier 44 and the timing circuit 47 causes the timed actuation of the tube 52 in the manner described in connection with FIGURE 5. The firing of the tube 52 causes current to flow through the double pole, double throw relay 73, and the actuation of the relay contacts 74A and 74B. Contacts 74A place a ground connection between resistors 72 and 67, thereby removing power from the timing circuitry. This causes filter capacitor 45 to discharge through the parallel path furnished by resistors 67 and 72 and the coil 74, and then through resistors 71 and 48. This discharge of the capacitor 45 serves to hold the relay 73 closed for a specified period of time after the tube 52 has ceased to fire, thereby also causing the prolonged energization of solenoid 28.

The actuation of relay 73 also serves to switch contacts 74B so that A.C. input power is furnished from the three-position switch 42 across the solenoid 28. Thus, the solenoid 28 is energized for a period determined by the actuation period of the relay 73 and is caused to provide the stepping function necessary to operate the mechanical apparatus of FIGURE 3.

It will therefore be readily apparent that the electronic pacer of the present invention provides a greatly improved means for pacing a typist or a reader through a specified drill to improve basic typing or reading skills. Former speed tests used in typewriting consisted of arranged materials with the number of strokes counted and indicated at the end of each line of printed material. By utilizing the pacer of the present invention, the typist merely sets the dial of the device at a given rate of speed and the pacer automatically keeps her at the rate of speed indicated on the dial. By keeping up with the indicator at the beginning of each line of writing, the typist or reader will become aware of whether the drill is being performed at the indicated speed, behind the indicated speed, or ahead of the indicated speed. Therefore, an extra effort can be exerted to attain the speed of typewriting or reading desired. Through the utilization of the pacer device, it is no longer necessary for a typist taking a speed test to stop at the end of a given time to calculate the number of strokes utilized or the gross words covered.

It will therefore be obvious to those skilled in the art that this invention provides a novel and improved automatic pacer capable of accurately pacing a typist or reader during a practice drill. The arrangement and type of components utilized within this invention may be subject to numerous modifications within the purview of these inventors, who intend only to be limited to a liberal interpretation of the specification and appended claims.

We claim:

1. An automatic pacer for pacing a student during a typing or reading drill comprising a casing, sheet attaching means provided upon the exterior of said casing to facilitate the attachment of a drill sheet to the exterior surface thereof, indicator means on said casing adjacent said sheet attaching means and adapted to move along the periphery of an attached drill sheet at a predetermined speed, timed drive means for said indicator means mounted within said casing, timing control means extending from said casing, and electronic timing means mounted within said casing and connected to control said timed mechanical drive means, said electronic timing means including input means for connection to receive electrical energy from a suitable power supply, an electronic tube electrically connected to said drive means, said tube including a plate, a cathode and a control electrode, means to supply power from said input means to said plate, a variable resistance means connected between said input means and the control electrode of said electronic tube to control the amplitude of the energy from said power source, said variable resistance means being operatively connected to said timing control means, and a timing circuit connected between said variable resistance and said tube across the cathode-control electrode circuit of said tube, said timing circuit providing D.C. pulses, the repetition rate of which is determined by the amplitude of the energy received from said variable resistance means to said control electrode to cause the periodic energization of said tube, whereby timed energization pulses are directed to said drive means to cause the periodic actuation thereof.

2. An automatic pacer for pacing a student during a typing or reading drill, comprising a casing, sheet attaching means provided upon said casing to facilitate the attachment of a drill sheet to the exterior surface thereof, indicator means on said casing adjacent said sheet attaching means and adapted to move longitudinally of said casing along the periphery of an attached drill sheet at a predetermined speed, timed mechanical drive means for said indicator means mounted within said casing, a three-position control knob and a multi-position speed control knob extending from said casing, and electronic timing means mounted within said casing, said electronic timing means including input means for connection to an A.C.

power source, switching means connected to said input means, said switching means being connected to said three-position control knob, an electronic tube electrically connected to said mechanical drive means, said tube including a plate, a cathode, and a control electrode, means to supply A.C. power from said switching means to said plate, rectifier means connected between said switching means and the control electrode of said electronic tube, a timing circuit connected across the cathode-control electrode circuit of said tube, said timing circuit providing timed D.C. pulses from said rectifier to said control electrode, whereby said tube is periodically energized to provide timed energization pulses to said mechanical drive means, and a variable resistance connected between said rectifier means and said timing circuit, said variable resistance being connected to said multi-position speed control knob, whereby the rectified power from said rectifier to said timing circuit may be varied in accordance with the setting of said speed control knob to cause said timing circuit to vary the energization rate of said electronic tube.

3. An automatic pacer for pacing a student during a typing or reading drill comprising a casing, sheet attaching means provided upon said casing to facilitate the attachment of a drill sheet to the exterior surface thereof, indicator means on said casing adjacent said sheet attaching means and adapted to move longitudinally of said casing along the periphery of an attached drill sheet at a predetermined speed, timed mechanical drive means for said indicator means mounted within said casing, a three-position control knob and a multi-position speed control knob extending from said casing, and an electronic timing means mounted within said casing and connected to control said timed mechanical drive means, said electronic timing means including input means for connection to an A.C. power supply, first switching means connected to said input means for energizing said electronic timing means, said first switching means being operatively connected to said three-position control knob, a gas tube electrically connected to said mechanical drive means, said gas tube including a plate, a cathode, and a trigger anode, means to supply A.C. power from said first switching means to said plate, rectifier means connected between said first switching means and the trigger anode of said gas tube, an electronic timing unit connected across the cathode-trigger anode circuit of said gas tube, said timing unit including two individual timing circuits, second switching means connected between said rectifier means and said individual timing circuits, said second switching means being coupled to said first switching means, whereby, upon the operation of said first switching means, said second switching means is caused to selectively connect one of said individual timing circuits to the trigger anode of said gase tube, thereby enabling said timing circuit to provide timed D.C. pulses from said rectifier to said trigger anode to cause said gas tube to ionize periodically and provide timed energization pulses to said mechanical drive means, and a variable resistance provided between said rectifier means and said second switching means, said variable resistance being connected to said multi-position speed control knob to vary the rectified power from said rectifier to said timing unit in accordance with the setting of said speed control knob to cause said timing unit to vary the ionization rate of said gas tube.

4. The automatic pacer of claim 2 in which one of said individual timing circuits includes a capacitive timing means having a long time constant while the remaining timing circuit includes a capacitive timing means having a shorter time constant.

5. An automatic pacer for pacing a student during a typing or reading drill, comprising a casing having a face wall, a rear wall, and side walls, sheet attaching means provided upon said face wall to facilitate the attachment of a drill sheet to the exterior surface thereof, indicator means on said casing adjacent said sheet attaching means and adapted to move longitudinally of said casing along the periphery of an attached drill sheet at a predetermined speed, timed mechanical drive means for said indicator means mounted within said casing, said timed mechanical drive means including a ratchet mechanism, a drive unit connected to said ratchet mechanism, means to move said indicator means extending between said drive unit and said indicator means, and a solenoid operatively connected to drive said ratchet means, a three-position control knob and a multi-position speed control knob extending from said casing, and electronic timing means mounted within said casing, said electronic timing means including input means for connection to an A.C. power source, switching means connected to said input means, said switching means being operatively connected to said three-position control knob, an electronic tube including a plate, a cathode, and a control electrode, means to supply power from said switching means to said plate through the solenoid of said mechanical drive means, rectifier means connected between said switching means and the control electrode of said electronic tube, a timing circuit connected across the cathode-control electrode circuit of said tube, said timing circuit providing timed D.C. pulses from said rectifier to said control electrode whereby said tube is periodically energized to provide timed energization pulses to said solenoid, and a variable resistance connected between said rectifier means and said timing circuit, said variable resistance being connected to said multi-position speed control knob whereby the rectified D.C. power from said rectifier to said timing circuit may be varied in accordance with the setting of said speed control knob to cause said timing circuit to vary the energization rate of said electronic tube.

6. An automatic pacer for pacing a student during a typing or reading drill comprising a casing, sheet attaching means provided upon the exterior of said casing to facilitate the attachment of a drill sheet to the exterior surface thereof, indicator means on said casing adjacent said sheet attaching means and adapted to move along the periphery of an attached drill sheet at a predetermined speed, mechanical drive means for said indicator means mounted within said casing, a solenoid operatively connected to actuate said mechanical drive means, and electronic timing means mounted within said casing and connected to control the energization of said solenoid, said electronic timing means including input means for connection to a suitable power supply, an electronic tube electrically connected to control the energization of said solenoid, said tube including a plate, a cathode, and a control electrode, means to supply power from said input means to the plate and control electrode of said electronic tube, a timing circuit connected across the cathode-control electrode circuit of said electronic tube, said timing circuit providing timed pulses from said input circuit to said control electrode to cause the periodic energization of said electronic tube, whereby said solenoid is periodically energized, and means connected between said input means and said plate to cause said solenoid to remain energized for a predetermined period after the deenergization of said electronic tube.

7. An automatic pacer for pacing a student during a typing or reading drill comprising a casing having a face wall, a rear wall, and side walls, sheet attaching means provided upon said face wall to facilitate the attachment of a drill sheet to the exterior surface thereof, indicator means on said casing adjacent said sheet attaching means and adapted to move longitudinally of said casing along the periphery of an attached drill sheet, timed mechanical drive means for said indicator means mounted within said casing, said timed mechanical drive means including a ratchet mechanism, a drive unit connected to said ratchet mechanism, connecting means extending between said drive unit and said indicator means, and a solenoid operatively connected to drive said ratchet means, timing control means extending from said face wall, and electronic timing means mounted within said casing and controlled by said timing control means, said timing means including input means for connection to a suitable power supply, an electronic tube electrically connected to control the energization of said solenoid, said tube including a plate, a cathode, and a control electrode, means to supply power from said input means to the plate and control electrode of said electronic tube, a timing circuit connected across the cathode-control electrode of said electronic tube, said timing circuit providing timed pulses from said input circuit to said control electrode to cause the periodic energization of said electronic tube, whereby said solenoid is periodically energized, and means connected between said input means and said plate to cause said solenoid to remain energized for a predetermined period after the deenergization of said electronic tube.

8. An automatic pacer for pacing a student during a typing or reading drill comprising a casing, sheet attaching means provided upon said casing to facilitate the attachment of a drill sheet to the exterior surface thereof, indicator means on said casing adjacent said sheet attaching means and adapted to move longitudinally of said casing along the periphery of the attached drill sheet, mechanical drive means for said indicator means mounted within said casing, solenoid means operatively connected to actuate said mechanical drive means, and an electronic timing means mounted within said casing and connected to control said solenoid, said electronic timing means including input means for connection to an A.C. power supply, first switching means connected to said input means for energizing said electronic timing means, an electronic tube having a plate, a cathode, and a control electrode, rectifier means connected between said first switching means and the control electrode of said electronic tube, an electronic timing circuit connected across the cathode-control electrode circuit of said electronic tube, said electronic timing circuit causing the periodic energization of said tube, a grounded filter capacitor connected to said rectifier, a parallel plate circuit connected between said rectifier means and the plate of said electronic tube, said plate circuit including a double pole, double throw relay having first contact means and second contact means, first circuit means including said solenoid connected between said first contact means and said first switching means, and second circuit means including said second contact means connected between said parallel plate circuit and ground, said double pole, double throw relay being periodically energized by said electronic tube to cause the closure of said first and said second contact means, said first contact means connecting said solenoid across said A.C. power supply and said second contact means connecting said plate circuit to ground, whereby said filter capacitor is caused to discharge through said plate circuit and maintain the energization of said double-pole, double throw relay for a predetermined period after the de-energization of said electronic tube.

9. An automatic pacer for pacing a student during a typing or reading drill comprising a casing, means provided upon said casing to facilitate the attachment of a drill sheet to the exterior surface thereof, means carried by said casing to visually indicate, in periodic timed succession, a plurality of points along the periphery of an attached drill sheet, mechanical drive means mounted within said casing and operatively connected to control the operation of said visual indicating means, said mechanical drive means including a ratchet mechanism, a drive unit connected to said ratchet mechanism, connecting means extending between said drive unit and said indicator means, and a solenoid operatively connected to drive said ratchet mechanism, timing control means provided upon said casing, and electronic timing means mounted within said casing and connected to provide timed electrical pulses to energize said solenoid, said electronic timing means including input means for connection to a suitable source of electrical energy, an electronic tube electrically connected to said solenoid, said tube including a plate, a cathode, and a control electrode, means to supply power from said input means to said plate, and control electrode of said electronic tube, a variable timing circuit connected across the cathode-control electrode circuit of said electronic tube and operatively coupled to be controlled by the timing control means, said timing circuit providing timed pulses from said input circuit to said control electrode to cause the periodic energization of said electronic tube, whereby said solenoid is periodically energized.

10. An automatic pacer for pacing a student during a typing or reading drill comprising a casing, sheet attaching means provided upon said casing to facilitate the attachment of a drill sheet to the exterior surface thereof, indicator means on said casing adjacent said sheet attaching means and adapted to move longitudinally of said casing along the periphery of an attached drill sheet at a predetermined speed, timed mechanical drive means for said indicator means mounted within said casing, a function control knob and a multi-position speed control knob extending from said casing, and an electronic timing means mounted within said casing and connected to said timed mechanical drive means, said electronic timing means including input means for connection to a source of electrical energy, an electronic tube electrically connected to control said mechanical drive means, said electronic tube including a plate, a cathode and a control electrode, means to supply electrical energy from said energy source to said plate and control electrode, a variable electronic timing unit connected across the cathode-control electrode circuit of said electronic tube and being operatively attached to be controlled by said multi-position speed control knob, said timing unit including two individual timing circuits, switching means connected between said input means and said individual timing circuits, said switching means being coupled to said function control knob whereby, operation of said function control knob causes said switching means to selectively connect one of said individual timing circuits to the control electrode of said electronic tube to enable said timing circuit to provide timed D.C. pulses to said control electrode, said pulses causing said electronic tube to be periodically energized to provide timed energization pulses to said mechanical drive means.

11. The automatic pacer of claim 10 wherein said mechanical drive means includes a ratchet mechanism, a drive unit connected to said ratchet mechanism, connecting means extending between said drive unit and said indicator means, and a solenoid operatively connected to drive said ratchet mechanism, said solenoid receiving timed energization pulses from said electronic tube whereby said indicator means is caused to move periodically at a predetermined rate.

References Cited in the file of this patent

UNITED STATES PATENTS

| | | |
|---|---|---|
| Re. 23,030 | Holt | Aug. 24, 1948 |
| 754,983 | Esson | Mar. 22, 1904 |
| 1,087,672 | Ludington | Feb. 17, 1914 |
| 1,762,811 | Charlton | June 10, 1930 |
| 1,879,641 | Sunkenberg et al. | Sept. 27, 1932 |
| 2,605,449 | Schrader | July 29, 1952 |
| 2,745,313 | Taylor | May 15, 1956 |
| 2,887,006 | Yale | May 19, 1959 |
| 2,900,021 | Richtmyer et al. | Aug. 18, 1959 |
| 2,915,833 | Genest | Dec. 8, 1959 |